United States Patent [19]

Erwin

[11] 3,809,932
[45] May 7, 1974

[54] MEANS PREVENTING CONTINUED ROTATION IN A WRONG-WAY DIRECTION OF ROTATING MEMBER

[75] Inventor: Robert Dale Erwin, Indianapolis, Ind.

[73] Assignee: P. R. Mallory & Co. Inc., Indianapolis, Ind.

[22] Filed: Apr. 13, 1973

[21] Appl. No.: 350,721

[52] U.S. Cl. .................................. 310/41, 310/164
[51] Int. Cl. ........................................... H02k 7/10
[58] Field of Search .............. 310/41, 156, 162–164; 318/136; 192/4

[56] References Cited
UNITED STATES PATENTS

| | | |
|---|---|---|
| 2,293,994 | 8/1942 | McLoughlin .................. 310/41 UX |
| 2,436,231 | 2/1948 | Schellens ............................. 310/41 |
| 2,722,297 | 11/1955 | Gates, Jr. ............................... 192/4 |
| 2,874,809 | 2/1959 | Poole .............................. 310/41 UX |
| 3,308,315 | 3/1967 | Mahon et al. ......................... 310/41 |
| 3,350,589 | 10/1967 | Suarnias .............................. 310/164 |
| 3,501,657 | 3/1970 | Heinzen et al. ....................... 310/41 |

Primary Examiner—D. F. Duggan
Attorney, Agent, or Firm—Richard H. Childress; Charles W. Hoffmann; Robert F. Meyer

[57] ABSTRACT

A rotating member includes stop means engaging an engagement means carried on an accompanying gear upon rotation in a wrong-way direction of the rotating member. The accompanying gear further includes a channel means through which the stop means passes uninhibited upon continued rotation in a correct direction of the rotating member.

24 Claims, 5 Drawing Figures

PATENTED MAY 7 1974　　　　　　　　　　　　　　　3,809,932

MEANS PREVENTING CONTINUED ROTATION IN A WRONG-WAY DIRECTION OF ROTATING MEMBER

Generally speaking, the present invention relates to a directional means preventing continued rotation in a wrong-way direction of a rotating member which, in the illustrated embodiment, is a permanent magnet rotor of a synchronous motor. The directional means preventing continued rotation in a wrong-way direction of a rotating member comprises a housing, a rotating member rotatably journaled in the housing, a stop means carried on the rotating member, a first gear, a keying means keying the first gear to the rotating member providing a controlled degree of rotational freedom of the first gear with respect to the rotating member, and a second gear rotatably journaled in the housing and engaging the first gear including an engagement means engaging the stop means on the first gear upon rotation in a wrong-way direction of the rotating member.

Synchronous motors are used in a wide variety of motor applications including clocks and timer switches for domestic appliances such as clothes washers and dryers. Synchronous motors of this type require a directional means to insure continuous rotation in a correct direction. A shading means, employing a shading conductor of a high electrically conductive metal such as copper or silver, is sometimes used to provide directional control. Although this is a quiet system, it is expensive due to the high cost of the high electrically conductive metal.

A host of synchronous motors are available with mechanical directional means, many being less expensive to produce than comparable motors with shading means. But, most are objectionably noisy. This noise, in many cases, is due to a continuous contact of a member against a portion of a rotating member during the operation of the motor. An example of this contact is the rubbing of a one-way pawl against a one-way cam portion of a rotor. In this example when the motor starts, the pawl stops the cam in an incorrect direction of rotation and bounces it back in a correct direction.

However, as the rotor rotates in the correct direction the pawl continues to follow and rub along the cam, the resulting rubbing producing a noise that is sometimes unintentionally amplified to an objectionably high level when the motor is mounted inside a metal appliance cabinet. The cabinet actually acts as a sound box to amplify seemingly insignificant sounds to annoying levels.

Another example of a mechanical directional means for a synchronous motor that produces unwanted noise is a system that employs an arm pivoted about a gear and engaging a stop means on the rotor of the motor. Such an arm is usually journaled, with light friction, to the gear that meshes with the output pinion of the rotor. The light friction is necessary to allow the arm to rotate initially with the gear until either the stop means on the rotor or an "out-of-the-way" post on a housing is engaged by the arm. Although, necessary, the friction produces noise, and again, the noise may be unintentionally and inadvertently amplified in the motor's application.

Another problem inherent in a mechanical directional means for a rotor of a permanent magnet motor is a tendency of the rotor to balk at starting in the correct direction after it has started incorrectly and has encountered a stop means. Many permanent magnet rotors have pinions integral with or rigidly affixed to them. Upon starting incorrectly, the pinion on the rotor immediately starts driving a gear train. Then when the rotor is reversed by a direction control system, the inertia built up in the gear train tends to discourage a clean, free start of the rotor back in the correct direction. Sometimes, the rotor will even kick in the incorrect direction immediately after being reversed in the correct direction. In addition to this problem, some permanent magnet synchronous motors have been known to fail to start, in either direction, when an accompanying gear train imposes a heavy load on the rotor.

To lessen the possibility of faulty starts, such as those just described, a lost motion device is sometimes used. The lost motion device comprises a pinion loosely keyed to the rotor of the motor so that the rotor can start load free and run uninhibited in the correct direction a few degrees before an accompanying gear train is engaged by the pinion. Two problems with lost motion devices is that they require extra structure that results in higher material and manufacturing costs, and they don't contribute to or compliment the starting mechanism of the motor.

Accordingly, an important feature of the present invention is to provide a directional means preventing continued rotation in a wrong-way direction of a rotating member. Another important feature of the present invention is to provide a directional means preventing continued rotation in a wrong-way direction of a rotating member, the directional means being virtually free of noise and friction after the rotating member has started in the correct direction of rotation. Another important feature of the present invention is to provide a directional means preventing continued rotation in a wrong-way direction of a permanent magnet rotor of a synchronous motor that is virtually free of noise and friction after the rotor has started in the correct direction of rotation. Another feature of the present invention is to provide a directional means for preventing continued rotation in a wrong-way direction of a permanent magnet rotor of a synchronous motor incorporating a lost-motion device acting between the rotor and an output pinion carried on the rotor to facilitate starting of the motor. Another feature of the present invention is to provide a directional means for preventing continued rotation in a wrong-way direction of a permanent magnet rotor of a synchronous motor that employs a pinion member keyed to the rotor of the motor with a predetermined degree of rotational freedom. Another feature of the present invention is to provide a directional means for preventing a continued rotation in a wrong-way direction of a permanent magnet rotor of a synchronous motor including a stop means carried on the rotor engaging an engagement means carried by a gear meshing with a pinion loosely keyed to the rotor, the engagement occuring shortly after the rotor starts to rotate in a wrong-way direction. Still another feature of the present invention is to provide a directional means for preventing continued rotation in a wrong-way direction of a permanent magnet rotor of a synchronous motor that includes at least one projection extending from a surface of the permanent magnet rotor engaging at least one projection carried by a gear meshing with a pinion loosely keyed to the rotor, the engagement occuring shortly after the rotor starts to rotate in a wrong-way direction. Yet another feature of the present invention is to provide a directional means for preventing continued rotation in a wrong-way direction of a permanent magnet rotor of a synchronous motor incorporating a lost-motion device that facilitates starting of the synchronous motor under load conditions which could, without the lost-motion system, cause the motor to fail to start. Yet another feature of the present invention is to provide a directional means for preventing continued rotation in a wrong-way direction of a permanent magnet rotor of a synchronous motor that is simple in construction and, therefore, easy to produce and assemble by mass production methods and machines.

These and other features of the invention will become more apparent from the following description taken in conjunction with the accompanying drawing wherein.

Figure 1:
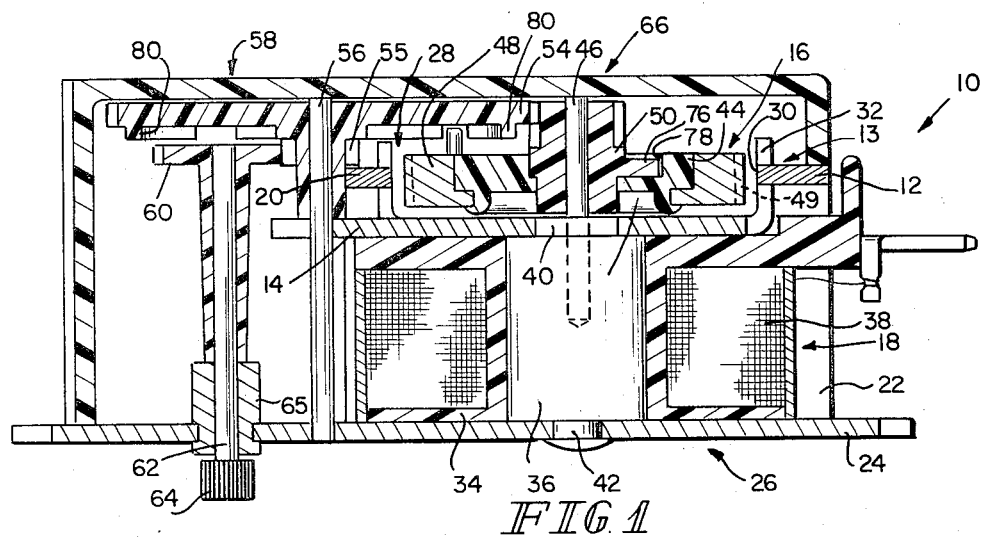
FIG. 1 is an elevation view of a permanent magnet synchronous motor employing an embodiment of the present invention to prevent continued rotation in a wrong-way direction of a permanent magnet rotor of the motor.

Referring to FIG. 1, a permanent magnet synchronous motor 10 includes a field structure 13, a permanent magnet rotor 16, and an energizing winding 18. Field structure 13 includes an outer field plate 12 and an inner field plate 14. The outer field plate 12 is substantially U-shaped including a flat bottom portion 20 and a pair of opposed upstanding legs 22 extending therefrom. The distal ends of the upstanding legs engage a mounting plate 24 to provide an enclosure 26 extending linearly to an area near the center of the mounting plate. There is an aperture 28 provided in the flat bottom portion 20 into which a plurality of poles 30 extend more or less generally in a circular fashion. The inner field plate 14 includes a substantially flat plate having integral poles 32 formed therefrom by lancing radial strips out of the plate. The poles are bent upwards to be intermeshed with the poles 30 of the outer field plate.

The energizing winding 18 includes a bobbin 34 surrounding an iron core 36 and a coil 38 of a predetermined number of turns of wire carried on the bobbin. The coil is electrically insulated. The iron core 36 includes a boss portion 40 which carries the inner field plate 14 and a stud 42 which serves to connect the core 36 to the mounting plate 24.

The permanent magnet rotor 16 includes a hub 44 which is rotatably carried on a rotor shaft 46. A permanent magnet 48 is rigidly carried on the hub. A pinion member 50 is journaled for a limited degree of rotation in hub 44. The rotational axis of pinion member 50 is substantially coincident with the rotational axis of said permanent magnet rotor. The pinion member 50 engages a second gear 54 of a gear train rotatably journaled to rotate about a shaft 56. The rotor shaft 46 is rigidly held in the iron core 36. The permanent magnet 48 may be fabricated of a material of a relatively high energy product partially oriented magnetic material, such as barium ferrite-impregnated ceramic, with its outer periphery being impressed or magnetized into seperate pole segments 49 of alternate sets of poles of north and south polarity. As shown, the rotor 16 is disposed within the intermeshed poles of the inner and outer field plates 14 and 12 and rotatable therein.

A gear train 58 is coupled to the motor 10 through the pinion member 50 carried on the rotor 16. The gear train 58 comprises second gear 54, a second pinion 55, a third gear 60, and an output pinion 64. Third gear 60 and output pinion 64 are carried on a shaft 62 rotatably journaled in a bushing 65. The bushing 65 is carried by the mounting plate 24. The rotational axes of the gears and pinions are substantially parallel to the rotational axis of the permanent magnet rotor.

In a synchronous motor such as described, a directional means is usually needed to insure that the rotor of the motor will run in the proper direction. In the present invention directional means 66 prevents continued rotation in a wrong-way direction of permanent magnet rotor 16. Directional means 66 includes a stop means 68, a keying means 70, an engagement means 72, and a channel means 82.

Stop means 68, which aids in stopping permanent magnet rotor 16, comprises at least one stop projection 74 carried on permanent magnet 48.

Keying means 70, keying pinion member 50 to permanent magnet rotor 16, comprises at least one key projection 76 carried on pinion member 50 and at least one recess 78 located in hub 44. Key projection 76, and pinion member 50, are allowed a predetermined degree of rotational freedom determined by the angular size of recess 78. Recess 78 is limited angularly in size by side walls 90 and 92.

The keying means 70 may, in the alternative, comprise at least one key projection carried on hub 44 and at least one recess located in pinion member 50. The key projection and pinion member 50 are again allowed a predetermined degree of rotational freedom by the angular size of the recess. The recess is limited angularly in size by side walls 90 and 92.

Figures 2, 3:
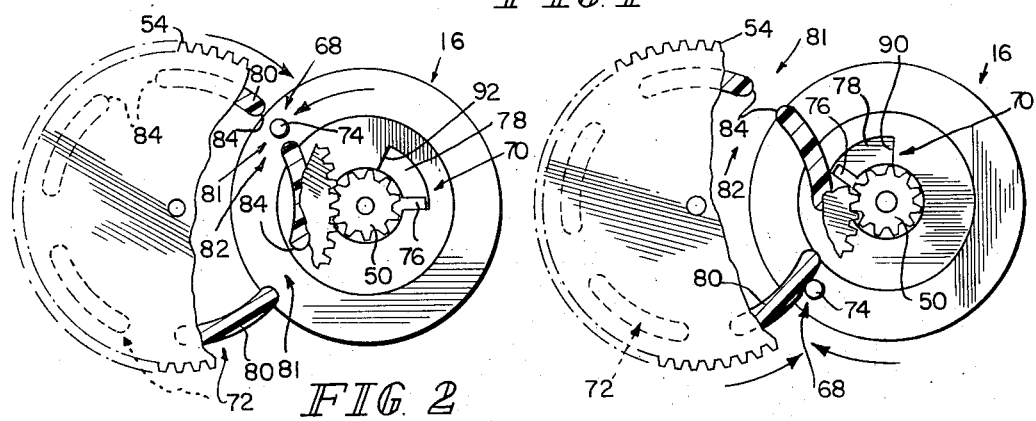
FIG. 2 is a top view of a portion of the motor shown in FIG. 1 illustrating the permanent magnet rotor rotating in a correct direction of rotation.
FIG. 3 is a top view of the same portion of the motor shown in FIG. 2 but with the permanent magnet rotor, rotating in wrong-way direction of rotation.

Engagement means 72 comprises at least one engagement projection 80 extending from second gear 54 in such a manner that stop projection 74 can engage one of the engagement projections, as shown in FIG. 3, during rotation in a wrong-way direction (shown in FIG. 3 as clockwise) of permanent magnet rotor 16.

Each of engagement projections 80 are illustrated in the embodiment shown in FIGS. 2 and 3 as being of substantially the same size and shape and protruding at regular angular intervals from a face of second gear 54.

Channel means 82 comprises the space 81 through which stop projection 74 may travel uninhibited without engaging engagement means 72 and includes windows 84 disposed between engagement projections 80. As shown in FIG. 2, stop projection 74 can travel uninhibited through channel means 82 during continued rotation in a correct direction (shown as counterclockwise in FIG. 2) of permanent magnet rotor 16.

Figure 4:
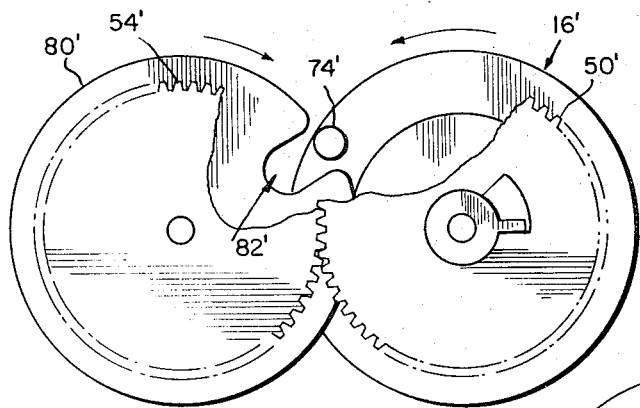
FIG. 4 is a top view of another embodiment of the invention. In this view, the rotor is rotating in a correct direction.
Figure 5:
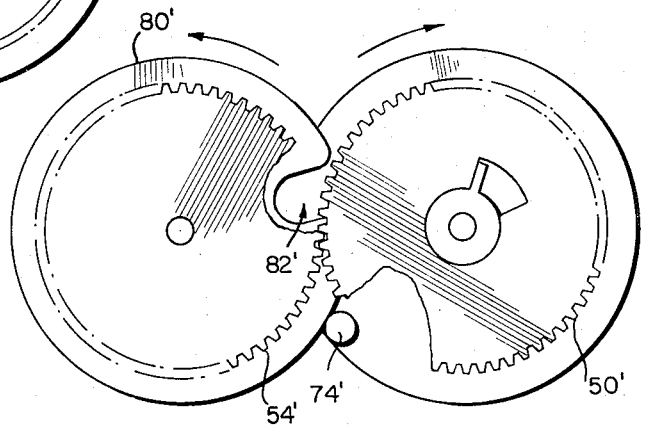
FIG. 5 is a top view of the same embodiment shown in FIG. 4 but with the rotor rotating in a wrong-way direction.

Another embodiment of the invention, shown in FIGS. 4 and 5, utilizes only one engagement projection 80'. Stop projection 74' can engage engagement projection 80' during rotation in a wrong-way direction (shown as clockwise in FIG. 5) of permanent magnet rotor 16'. In a correct direction of rotation (shown as counter clockwise in FIG. 4) stop projection 74' can travel uninhibited through channel means 82'.

In the embodiments shown in FIG. 4 and 5, the gear ratio between pinion member 50' and second gear 54' is one to one. In the embodiments illustrated in FIGS. 2 and 3, the gear ratio between pinion member 50 and second gear 54 is one to five. Many other gear ratios work equally as well as these illustrated embodiments. In order to insure that stop projection 74 passes uninhibited between engagement projections 80, the number of windows should be equal to, or an integer multiple of, a quotient obtained by dividing the number of gear teeth on second gear 54 by the number of gear teeth on pinion member 50. In the embodiment in FIGS. 2 and 3, the quotient is five and the number of windows 80 shown in FIGS. 2 and 3 is also five.

In operation, coil 38 is energized by an alternating electric current provided by leads, not shown, whereupon permanent magnet rotor 16 will turn in either a clockwise or counterclockwise direction. FIG. 2 illustrates an embodiment of the invention wherein the rotor desirably turns in a counterclockwise direction when the motor is in operation. In this mode, key projection 76 is engaged by side wall 90 of slot 78 in hub 44 as permanent magnet rotor 16 is rotated. In this spaced relationship of stop projection 74, key projection 76, slot 78, and engagement projections 80, stop projection 74 will pass through a window 84 and back out another window 84 without encountering any of engagement projections 80. Permanent magnet rotor 16 will continue to rotate in this counterclockwise rotation continuously with no interference of stop projection 74 with an engagement projection 80.

FIG. 3 illustrates the same embodiment shown in FIG. 2, but with rotor 16 rotating in a wrong-way direction, shown here as clockwise. In this mode, key projection 76 is engaged by side wall 92 of recess 78 in hub 44 as permanent magnet rotor 16 starts rotating. The phase or spaced relationship of key projection 76, recess 78, engagement projection 80, and stop projection 74 are now different than they were in FIG. 2 when permanent magnet rotor 16 was turning counterclockwise. In this relationship, stop projection 74 will not pass into through a window 84 as it did in FIG. 2 but will encounter one of engagement projections 80. When this encounter occurs, the rotor 16 stops its wrong-way rotation and bounces back in a correct (counterclockwise) direction, whereupon key projection 76 is engaged by side wall 90 of recess 78 thereby reestablishing the phase relationship of key projection 76, slot 78, engagement projections 80, and stop projection 74 as illustrated in FIG. 2. Permanent magnet rotor 16 now continues to run unopposed as stop projection 74 passes clear of engagement projections 80.

The same type of phase relationship occurs in the illustrated embodiment in FIGS. 4 and 5 between stop projection 74', engagement projection 80', key projection 76', and recess 78' as was described for the embodiment shown in FIGS. 2 and 3. In this embodiment, stop projection 74' enters and leaves the same window 84' in a correct (counterclockwise) direction of rotation of permanent magnet rotor 16'.

A lost motion device 81 is incorporated into directional means 66. The operation of lost motion device 81 is inherent in the operation of directional means 66. Within one revolution of permanent magnet rotor's turning in a wrong-way direction, stop projection 74 engages engagement projection 80. Pinion member 50 stays engaged and stationary with second gear 54 while permanent magnet rotor 16 starts back in the correct direction completely free of the load imposed by gear train 58. Only after key projection 76 is encountered by side wall 90 in hub 44, which is rigidly affixed to permanent magnet rotor 16, does gear train 58 start turning again. This short load-free feature occuring immediately after a wrong-way start discourages stalling of the motor 10 by allowing permanent magnet rotor 16 to start moving before encountering a load.

What is claimed is:

1. In a synchronous motor where a permanent magnet rotor is rotatably driven by an alternating magnetic field generated by a cooperating energizing winding and a field structure, a directional means preventing a continued rotation in a wrong-way direction of said rotor comprising:
   a. a pinion member carried by and journaled for rotation about said permanent magnet rotor;
   b. a stop means carried on said rotor;
   c. keying means loosely keying said pinion member to said permanent magnet rotor providing a controlled degree of rotational freedom of said pinion member in respect to said permanent magnet rotor;
   d. a second gear meshing with said pinion member;
   e. an engagement means carried by said second gear and engaging said stop means upon rotation in a wrong-way direction of said permanent magnet rotor; and
   f. channel means located in said second gear in spaced relation to said engagement means through which said stop means can pass uninhibited upon continued rotation in a correct direction of said permanent magnet rotor.

2. The synchronous motor according to claim 1 wherein said stop means comprises at least one stop projection extending from a face of said rotor.

3. The synchronous motor according to claim 1 wherein said engagemnt means includes at least one engagement projection extending from a face of said second gear.

4. The synchronous motor according to claim 3 wherein said channel means comprises the space in between said engagement projections of a face of said second gear.

5. The synchronous motor according to claim 1 wherein the rotational axis of said permanent magnet rotor and the rotational axis of said pinion member are substantially coincident.

6. The synchronous motor according to claim 1 wherein the rotational axis of said permanent magnet rotor and the rotational axis of said second gear are substantially parallel.

7. The synchronous motor according to claim 1 wherein said pinion member is loosely keyed by a keying means to said permanent magnet rotor to provide said limited degree of rotation to said pinion member relative to said permanent magnet rotor.

8. The synchronous motor according to claim 7 wherein said keying means comprises at least one key projection on said pinion member protruding into at least one recess in said permanent magnet rotor, the relative sizes of said key projection and said recess determining said limited degree of rotation.

9. The synchronous motor according to claim 7 wherein said keying means comprises at least one key projection on said permanent magnet rotor protruding into at least on recess in said pinion member, the relative sizes of said key projection and said recess determining said limited degree of rotation.

10. The synchronous motor according to claim 3 wherein each of said engagement projections are substantially the same shape and size.

11. The synchronous motor according to claim 3 wherein each of said engagement projections protrude at regular angular intervals from said face of said second gear.

12. Directional means preventing continued rotation in a wrong-way direction of a rotating member comprising:
   a. a housing;
   b. a rotating member rotatably journaled in said housing;
   c. stop means carried on said rotating member;
   d. a first gear;
   e. a keying means keying said first gear to said rotating member providing a controlled degree of rotational freedom of said first gear with respect to said rotating member;
   f. a second gear rotatably journaled in said housing and meshing with said first gear;
   g. engagement means carried on said second gear and engaging said stop means upon rotation in a wrong-way direction of said rotating member; and
   h. channel means located in said second gear in spaced relation to said engagement means through which said stop means can pass uninhibited upon continued rotation in a correct direction of said rotating member.

13. The directional means preventing continued rotation in a wrong-way direction of a rotating member according to claim 12 wherein said stop means comprises at least one stop projection extending from a face of said first rotating member.

14. The directional means preventing continued rotation in a wrong-way direction of a rotating member according to claim 12 wherein said engagement means comprises at least one engagement projection extending from a face of said second rotating member.

15. The directional means preventing continued rotation in a wrong-way direction of a rotating member according to claim 12 wherein said channel means comprises the space between said engagement projections, through which said stop projection can pass uninhibited upon continued rotation in a correct direction of said rotating member.

16. The directional means preventing continued rotation in a wrong-way direction of a rotating member according to claim 12 wherein the rotational axis of said rotating member and the rotational axis of said first gear are substantially coincident.

17. The directional means preventing continued rotation in a wrong-way of a rotating member according to claim 12 wherein the rotational axis of said rotating member and the rotational axis of said second gear are substantially parallel.

18. The directional means preventing continued rotation in a wrong-way direction of a rotating member according to claim 12 wherein said first gear is loosely keyed by a keying means to said rotating member to provide said limited degree of rotation to said first gear relative to said rotating member.

19. The directional means preventing a continued rotation in a wrong-way direction of a rotating member according to claim 18 wherein said keying means comprises at least one limit projection on said first gear protruding into at least one recess in said rotating member, the relative sizes of said projection and said recess determining said limited degree of rotation.

20. The directional means preventing a continued rotation in a wrong-way direction of a rotating member according to claim 18 wherein said keying means comprises at least one limit projection on said rotating member protruding into at least one recess in said first gear, the relative sizes of said projection and said recess determining said limited degree of rotation.

21. The directional means preventing a continued rotation in a wrong-way direction of a rotating member according to claim 14 wherein each of said engagement projections are substantially the same shape and size.

22. The directional means preventing a continued rotation in a wrong-way direction of a rotating member according to claim 14 wherein each of said engagement projections protrude at regular angular intervals from said face of said second gear.

23. In a synchronous motor where a permanent magnet rotor is rotatably driven by an alternating electromagnetic field generated by a cooperating energizing winding and a field structure, a directional means preventing continued rotation in a wrong-way direction of said rotor comprising:
   a. a pinion member carried by and journaled for rotation about said permanent magnet rotor;
   b. a stop means carried on said rotor;
   c. keying means loosely keying said pinion member to said permanent magnet rotor providing a controlled degree of rotational freedom of said pinion member in respect to said permanent magnet rotor;
   d. a second gear meshing with said pinion member;
   e. at least one engagement projection carried by said second gear and engaging said stop means upon rotation in a wrong-way direction of said permanent magnet rotor; and
   f. channel means located in said second gear in spaced relation to each of said engagement projections, including a window immediately adjacent to each of said engagement projections through which said stop means can pass uninhibited upon rotation in a correct direction of said permanent magnet rotor, wherein the number of said windows is equal to, or an integer multiple of, a quotient obtained by dividing the number of gear teeth on the second gear by the number of gear teeth on said pinion member.

24. In a synchronous motor where a permanent magnet rotor is rotatably driven by an alternating electromagnetic field generated by a cooperating energizing winding and a field structure, a directional means preventing a wrong-way direction of rotation of said rotor comprising:
- a. a pinion member carried by and journaled for rotation about said permanent magnet rotor;
- b. a stop means carried on said rotor;
- c. a second gear meshing with said pinion member;
- d. an engagement means carried by said second gear and engaging said stop means upon rotation in a wrong-way direction of said permanent magnet rotor; and
- e. channel means located in said second gear in spaced relation to said engagement means through which said stop means can pass uninhibited upon rotation in a correct direction of said permanent magnet rotor; and
- f. keying means loosely keying said pinion member to said permanent magnet rotor providing a controlled degree of rotational freedom of said pinion member in respect to said permanent magnet rotor allowing said permanent magnet rotor to start load-free before said pinion member starts driving said second gear.

* * * * *